United States Patent [19]
Hattori

[11] Patent Number: 5,774,175
[45] Date of Patent: Jun. 30, 1998

[54] STEREOSCOPIC TELEVISION

[75] Inventor: Tomohiko Hattori, Nagoya, Japan

[73] Assignee: Terumo Kabushiki Kaisha, Tokyo, Japan

[21] Appl. No.: 923,097

[22] Filed: Sep. 4, 1997

Related U.S. Application Data

[63] Continuation of Ser. No. 515,027, Aug. 14, 1995, abandoned, which is a continuation of Ser. No. 135,482, Oct. 13, 1993, abandoned.

[30] Foreign Application Priority Data

Oct. 14, 1992 [JP] Japan ................................. 4-303116
Sep. 8, 1993 [JP] Japan ................................. 5-248623

[51] Int. Cl.$^6$ ................................................. H04N 13/04
[52] U.S. Cl. .......................................................... 348/55
[58] Field of Search ................................. 348/42, 43, 44, 348/46, 49, 51, 54, 55, 59; 345/7, 87; H04N 13/04, 7/18

[56] References Cited

U.S. PATENT DOCUMENTS

| 4,649,425 | 3/1987 | Pund | 348/52 |
|---|---|---|---|
| 4,750,014 | 6/1988 | Frank | 396/287 |
| 4,799,739 | 1/1989 | Newswanger | 359/15 |
| 4,890,902 | 1/1990 | Doane et al. | 345/87 |
| 4,987,487 | 1/1991 | Ichinose et al. | 348/59 |
| 5,008,658 | 4/1991 | Russay et al. | 345/87 |
| 5,059,957 | 10/1991 | Todoriki et al. | 345/7 |
| 5,132,839 | 7/1992 | Travis | 359/462 |
| 5,162,785 | 11/1992 | Fagard | 345/87 |
| 5,311,220 | 5/1994 | Eichenlaub | 348/55 |
| 5,457,574 | 10/1995 | Eichenlaub | 359/619 |
| 5,568,314 | 10/1996 | Omori et al. | 348/51 |
| 5,606,455 | 2/1997 | Eichenlaub | 359/463 |

FOREIGN PATENT DOCUMENTS 2206763   1/1989   United Kingdom .

OTHER PUBLICATIONS

Moore, Jr., et al., "The Implementation of a Multi–View Autostereoscopic Display", 626 Image Technology Journal of the BKSTS 75 (1993)Jan./Feb.

Primary Examiner—Bryan Tung
Attorney, Agent, or Firm—Cushman Darby & Cushman IP Group of Pillsbury Madison & Sutro LLP

[57] ABSTRACT

A stereoscopic television which enables plural observers to simultaneously observe a stereoscopic images includes a color liquid-crystal plate, a monochrome TV display disposed behind the liquid-crystal plate, and a large format lens disposed between the color liquid-crystal plate and the monochrome TV display so as to focuss the observer's image on the screen of the TV display. The color liquid-crystal plate alternately displays stereo-pairs composed of left and right eye perspectives, and the monochrome TV display alternately displays inverted binary images of half face of each oberver. The large format lens distrubutes light emitted from the inverted binary images of half face of each observer to the left and right eyes of each observer through the color liquid-crystal plate, whereby the left and right eye perspectives of the stereo-pairs displayed by the liquid-crystal plate respectively reach the left and right eyes of each observer.

17 Claims, 7 Drawing Sheets

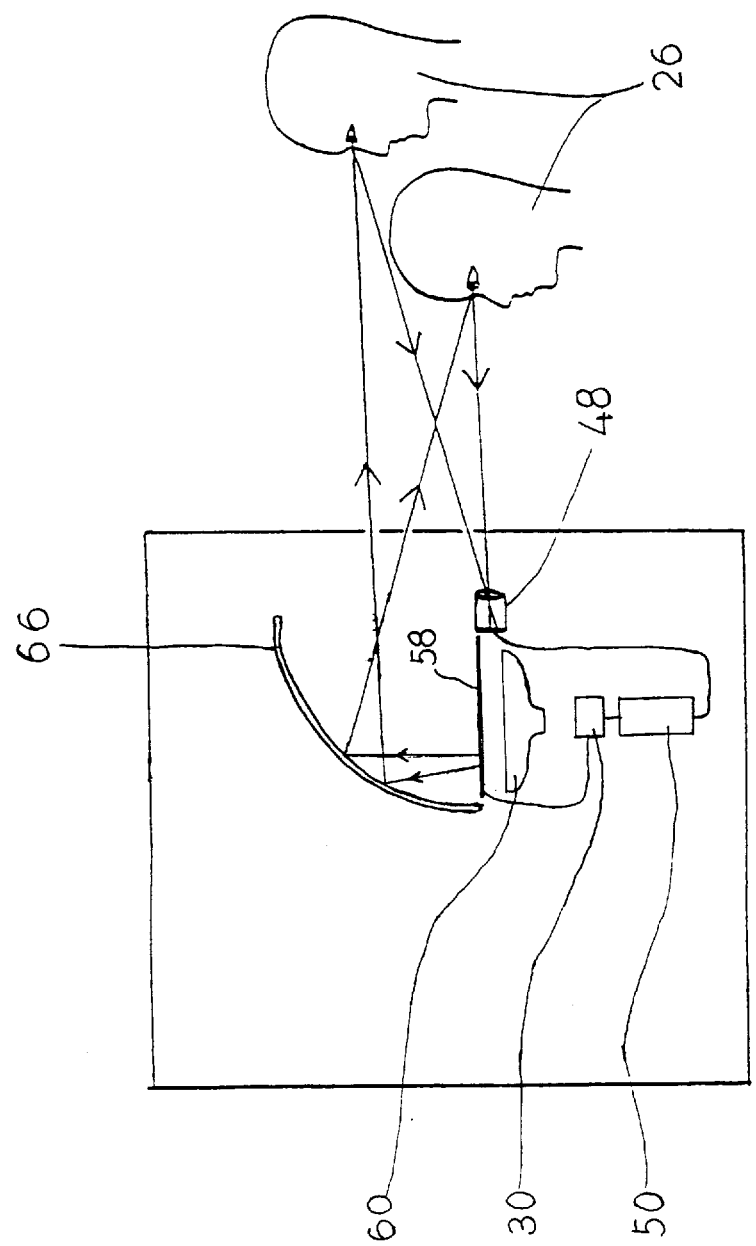

STEREOSCOPIC TELEVISION

This is a continuation of application No. 08/515,027, filed on Aug. 14, 1995 which is a continuation of application No. 08/135,482 filed Oct. 13, 1993 now abandoned.

BACKGROUND OF THE INVENTION

1. Field of the Invention

The present invention relates to a stereoscopic television employing a stereoscopic display system, which does not require special glasses or the like.

2. Description of the Related Art

One example of a conventional stereoscopic display system which enables plural persons to simultaneously observe stereoscopic images without wearing special glasses is disclosed in Japanese patent application laid-open No. Hei 5-244643 which was filed by the present inventor. As shown in FIG. 1, this conventional system includes a predetermined number of pairs (two pairs in FIG. 1) of video projectors 10. A large format lens 12 is positioned between the video projectors 10 and observers 14 for distributing the stereoscopic image to left and right eyes of each observer 14. Four sensors 16 are provided in the vicinity of projecting lenses 18 of each pair of video projectors 10 (In FIG. 1, only two sensors are illustrated) to detect the positions of each observer's eyes.

With the conventional stereoscopic display system having the above-described construction, by shifting the pair of video projectors 10 in accordance with the corresponding observer's eye position, each observer 14 can continuously observe the stereoscopic image without wearing special glasses or the like even if each observer 14 changes his position.

However, this conventional display system has a problem that in order to enable plural persons to simultaneously observe the stereoscopic image, a pair of video projectors are needed for each observer, accordingly the number of the observers is limited by the number of the video projectors.

SUMMARY OF THE INVENTION

One object of the present invention is to provide a stereoscopic television employing a stereoscopic display system, which enables stereosocopic images to be simultaneously observed by plural persons without wearing special glasses or the like.

The stereoscopic television of the present invention includes stereoscopic image display means which enables time-interlaced display of stereo-pairs composed of left and right eye perspectives, observer's image display means which enables time-interlaced display of binary images of the observer's face, and focusing means for focusing the left and right eye perspectives of the stereo-pairs to left and right eyes of each observer based on the binary images displayed by the observer's image display means. The observer's image display means is composed of two dimensional image display means. The focusing means is disposed on the plane from which it substantially focus the observer's image on a screen of the observer's image display means.

With the first aspect of the present invention, the stereoscopic image display means is composed of transparent and electro-optical spatial modulation elements, which are disposed in front of the focusing means, and the observer's image display means is composed of a back-light which is disposed behind the focusing means.

With the second aspect of the present invention, the stereoscopic image display means is disposed behind the observer's image display means, and the observer's image display means is composed of transparent and electro-optical spatial modulation elements which are disposed behind the focusing means.

The stereoscopic television of the present invention, may include taking means which is provided in vicinity of the focusing means to enable pictures of each observer's face to be continuously taken, and to output binary images to the observer's image display means. Furthermore, the stereoscopic television of the present invention may include illuminating means which is provided on left and right sides of the focusing means to alternately illuminate the observers' faces from the left and right sides thereof in synchronization with the stereoscopic image. In addition, the stereoscopic television of the present invention may include imaging means for substracting one of left and right illuminated face images of each observer from another one, and outputting an imaging signal to the observer's image display means.

With the stereoscopic television of the present invention, by displaying the binary face images of each observer on the screen of the observer's image display means in synchronization with the stereo-pairs at such a position as to geometrically agree with the observer's image focused by the focusing means, left and right eye perspectives of the stereo-pairs on the stereoscopic image display means are correctly distributed to the left and right eyes of each observer, whereby plural persons can simultaneously observe the stereoscopic image without wearing special glasses or the like.

Other objects, features and characteristics of the present invention will become apparent upon consideration of the following description and the appended claims with reference to the accompanying drawings, all of which form a part of this specification.

BRIEF DESCRIPTION OF THE DRAWING

FIG. 7 is a schematic side view illustrating optical paths of a fourth embodiment of a stereoscopic television provided in accordance with the principle of the present invention.

DETAILED DESCRIPTION OF THE PRESENTLY PREFERRED EXEMPLARY EMBODIMENTS

Figure 1:
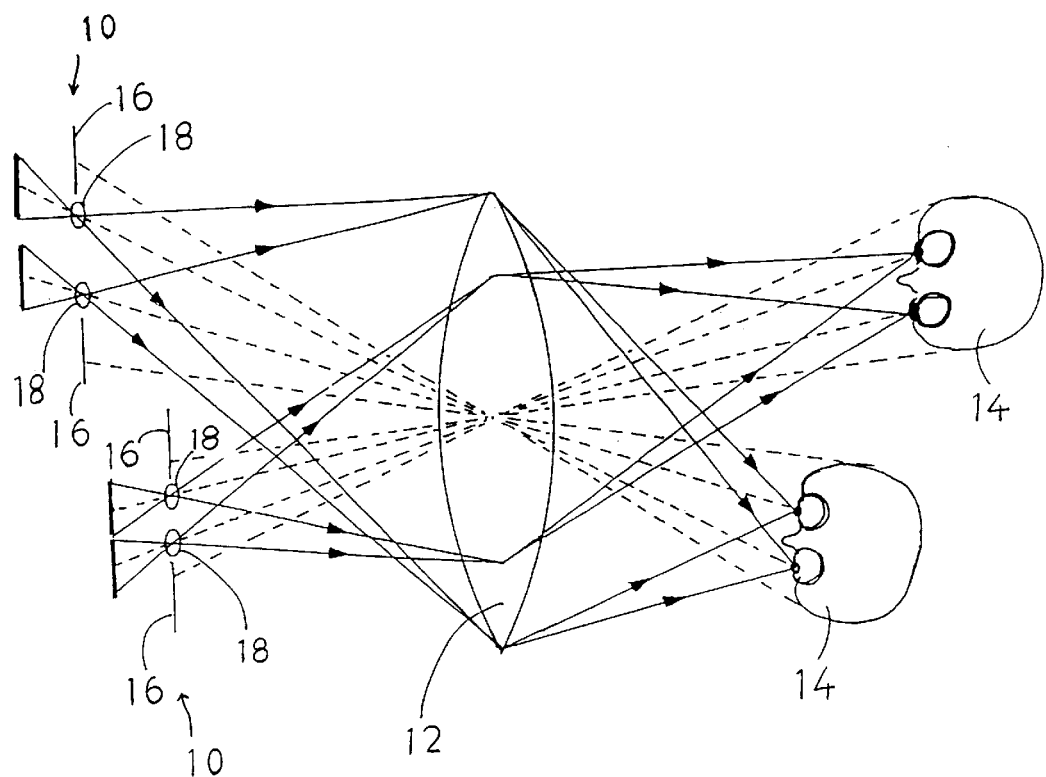
FIG. 1 is a schematic diagram illustrating a conventional stereoscopic display system.
Figure 2:
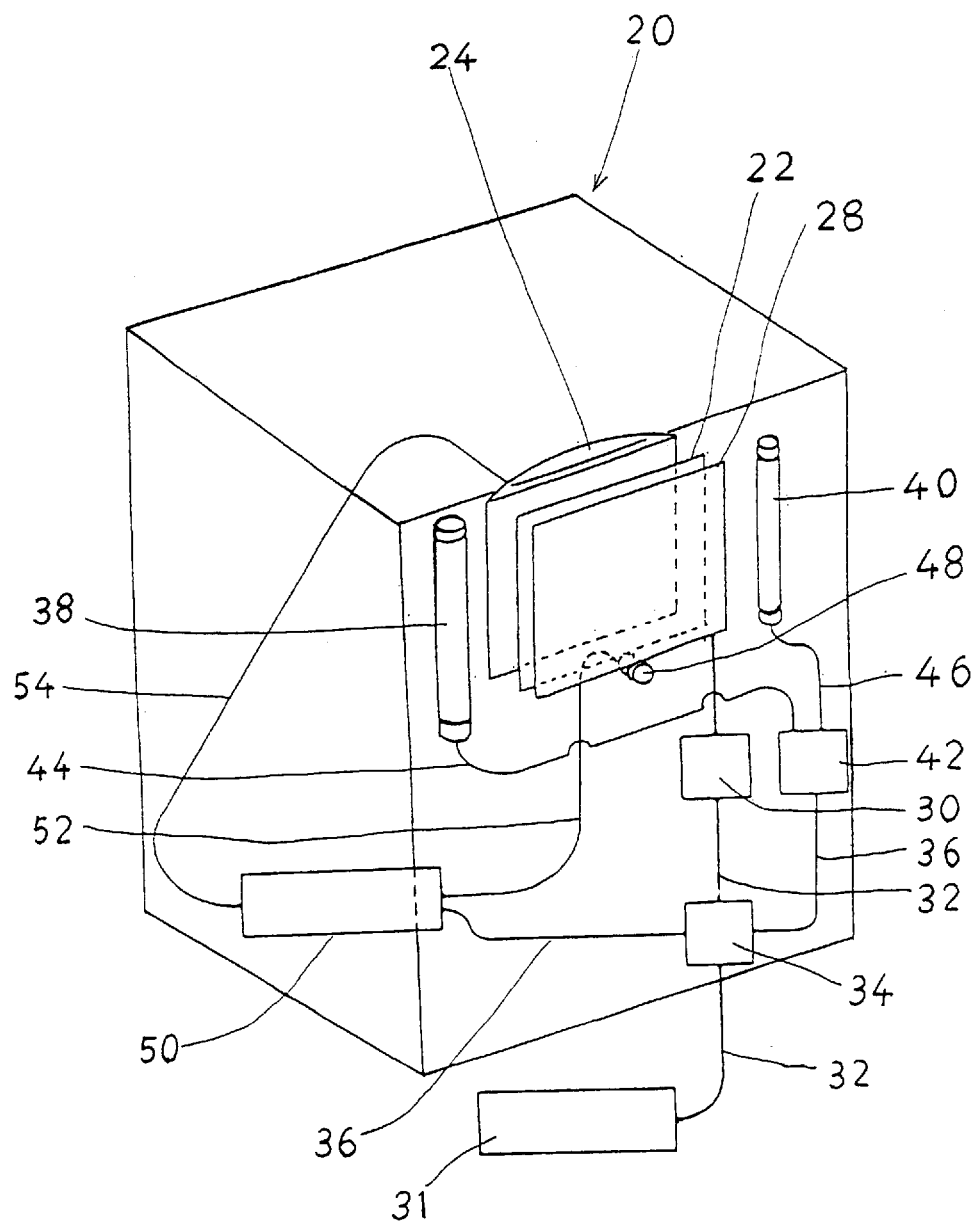
FIG. 2 is a schematic diagram illustrating a first embodiment of a stereoscopic television provided in accordance with the principle of the present invention.
Figure 3:
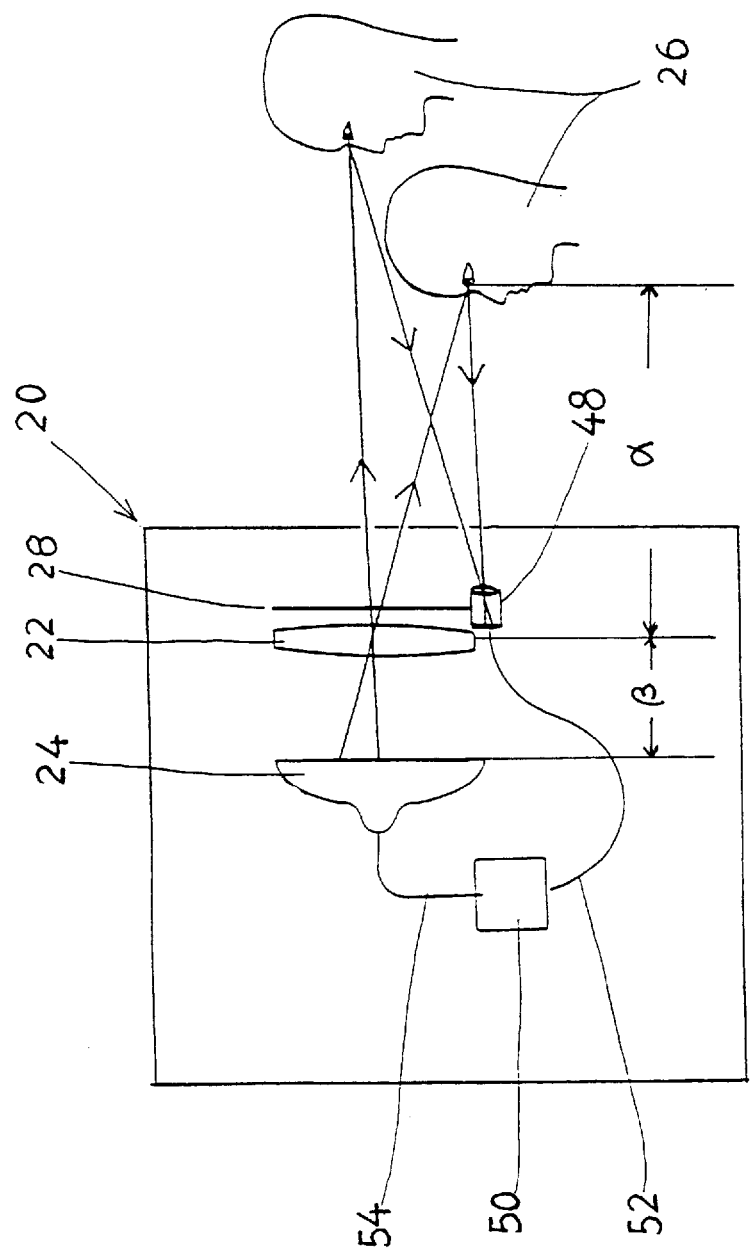
FIG. 3 is a schematic side view illustrating optical paths of the first embodiment.

FIGS. 2 and 3 illustrate a first embodiment of a stereoscopic television of the present invention. As shown, a stereoscopic television 20 has a large format lens 22. A monochrome TV display 24 as the two-dimensionally image display means composing the observer's image display means is disposed behind the large format lens 22 on the plane on which the large format lens 22 substantially focuses images of observers 26 (FIG. 3). Namely, the positional relationship between each observer 26, the large format lens 22 and the TV display 24 is substantially expressed by the following equation:

$$1/\alpha + 1/\beta = 1/f$$

where f is the focal length of the large format lens 22, α the distance between the effective lens plane of the large format lens 22 and eyes of each observer 26, and β the distance between the effective lens plane of the large format lens 22 and the screen of the TV display 24, as shown in FIG. 3.

A transparant color liquid-crystal plate 28 having a matrix circuit 30 (FIG. 2) is disposed between the large format lens 22 and the observers 26. In FIG. 2, a video tape recoder 31 is connected to the matrix circuit 30 to output a stereoscopic video signal 32 to the matrix circuit 30, and stereo-pairs composed of left and right eye perspectives are displayed on the transparent color liquid-crystal plate 28.

The transparent color liquid-crystal plate 28 serves as electro-optical spatial modulation elements which enable time-interlaced display of stereoscopic images.

The monochrome TV display 24 serves as a back-light which displays inverted observer's images to alternately distribute left and right eye perspectives to left and right eyes of each observer 26.

Furthermore, a stereoscopic synchronizing signal sampling circuit 34 is provided between the video tape recoder 31 and the matrix circuit 30 to sample a stereoscopic synchronizing signal 36 from the stereoscopic video signal 32.

Light sources 38 and 40 are disposed on left and right sides of the color liquid-crystal plate 28. A lightening circuit 42 to which the stereoscopic synchronizing signal 36 is input is respectively connected to the light sources 38 and 40 to output lightening signals 44 and 46 to the light sources 38 and 40, whereby the light sources 38 and 40 alternately illuminate the observers 26 from the left and right sides thereof in synchronization with the stereoscopic synchronizing signal 36.

A TV camera 48 is provided in the vicinity of the color liquid-crystal plate 28 (at about the center of the lower side thereof in FIGS. 2 and 3), and is connected to an imaging circuit 50 to which the stereoscopic synchronizing signal 36 is input. The TV camera 48 continuously takes images of the observers 26 who are alternately illuminated from the left and right sides thereof by means of the light sources 38 and 40, and outputs an image signal 52 which is composed of alternate left and right illuminated face images of the observers 26 to the imaging circuit 50.

The imaging circuit 50 subtracts one of the left and right illuminated face images of the image signal 52 from the other image and emphasizes contrast of the resultant image. Then, the imaging circuit outputs a binary image signal 54 to the monochrome TV display 24 so that inverted binary half face images of each observer appear at such a position as to geometrically agree with the observer's image which is focused by the large format lens 22.

With the first embodiment of the stereoscopic television having the above-described construction, upon input of the binary image signal 54, the monochrome TV display 24 alternately displays inverted left and right half face images of the observers 26 as white images on a black background.

As shown in FIG. 3, the alternate white right and left half face images on the TV display 24 distribute light to the liquid-crsytal plate 28 by way of the large format lens 22 in synchronization with the stereoscopic image of the liquid-crystal plate 28. When the left eye perspective is displayed on the liquid-crystal plate 28, the TV display 24 emits light from the left half face image to the left eye of each observer 26 through the liquid-crystal plate 28. Likewise, when a right eye perspective is displayed on the liquid-crystal plate 28, the TV display 24 emits light from the right half face image to the right eye of each observer 26 through the liquid-crystal plate 28. Accordingly, the obsrvers 26 can observe the image displayed on the color liquid-crystal plate 28 as a stereoscopic image.

In accordance with the present embodiment, the number of observers who can simultaneously observe the stereoscopic image is not limited, and accordingly, plural observers 26 can simultaneously observe them.

Figure 4:
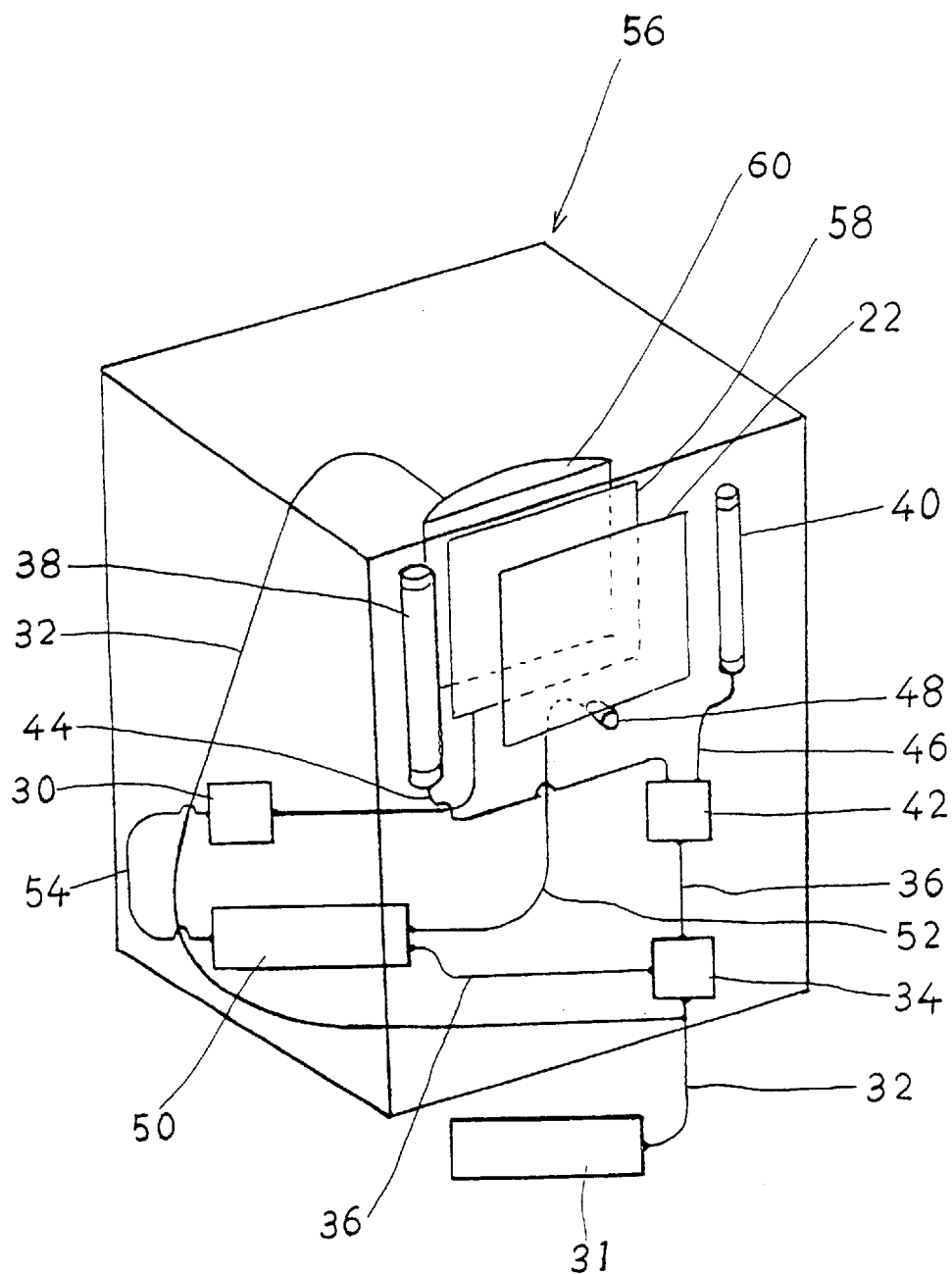
FIG. 4 is a schematic diagram illustrating a second embodiment of a stereoscopic televison provided in accordance with the principle of the present invention.
Figure 5:
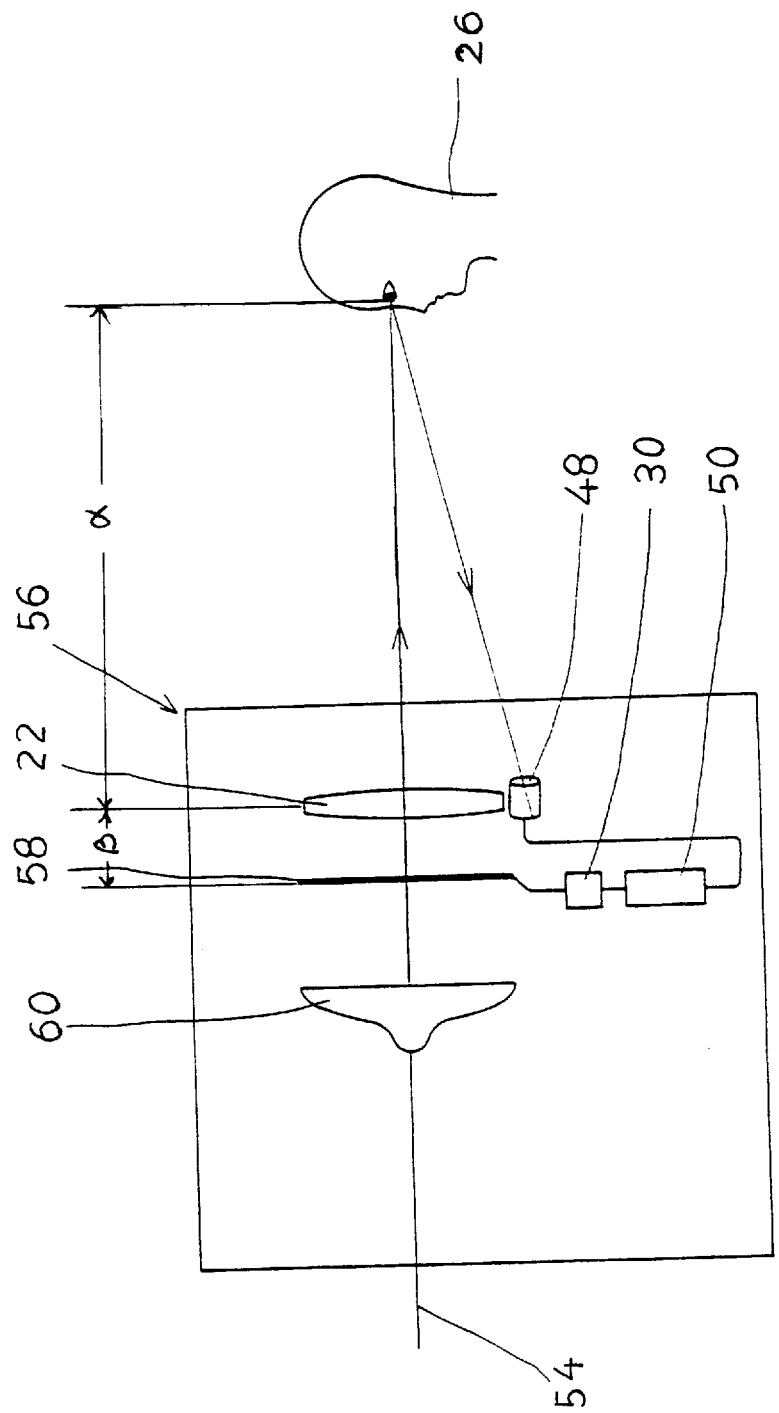
FIG. 5 is a schematic side view illustrating optical paths of the second embodiment.

FIGS. 4 and 5 illustrate a second embodiment of a stereoscopic television of the present invention. In the drawings, parts similar to those in FIGS. 2 and 3 are given the same numbers as in FIGS. 2 and 3, and repetition of the previous description will be omitted.

The stereoscopic television 56 of the second embodiment includes the large format lens 22, a monochrome liquid-crystal plate 58 and a color TV display 60 which are arranged in this order from the observer's side.

And the monochrome liquid-crystal plate 58 is disposed on such a plane on which the large format lens 22 substantially focuses each observer's image. Namely, the positional rlationship between the observer 26, the large format lens 22 and the liquid-crystal plate 58 is substantially expressed by the following equation:

$$1/\alpha + 1/\beta = 1/f$$

where f is the focal length of the large format lens 22, α the distance between the effective lens plane of the large format lens 22 and eyes of each observer 26 and β the distance between the effective lens plane of the large format lens 22 and the screen of the monochrome liquid-crystal plate 58, as shown in FIG. 5.

In FIG. 4, the video tape recoder 31 outputs a stereoscopic video signal 32 to the color TV display 60.

The color TV display 60 enables the time-interlaced display of inverted stereo-pairs composed of left and right eye perspectives.

The TV camera 48 is provided in the vicinity of the large format lens 22 (at about the center of the lower side of the large format lens 22 in the drawing) to continuously take pictures of alternate left and right illuminated face images of each observer 26 in synchronization with the stereo-pairs on the color TV display 60, and output an image signal 52 to the imaging circuit 50.

The imaging circuit 50 outputs a binary image signal 54 to the monochrome liquid-crystal plate 58 by way of the matrix circuit 30 so that inverted binary half face images appear at such a position as to geometrically agree with the observer's image focused by the large format lens 22.

As a result, in the monochrome liquid-crystal plate 58, inverted left and right half face images are alternately displayed as white images on the black background. Due to this alternate left and right half face images, the monochrome liquid-crsytal plate 58 distributes the left and right eye perspectives of the stereo-pairs on the color TV display 60 to the left and right eyes of each observer 26 by way of the large format lens 22.

As shown in FIG. 5, each observer 26 observes the color TV display 60 through the large format lens 22 and the monochrome liquid-crystal plate 58.

When the color TV display 60 displays the right-eye perspective of the inverted stereo-pairs, the liquid-crystal plate 58 displays the inverted observer's right half face image in synchronization with the color TV display 60 so as to distribute the right-eye perspective only to the right eye of each observer 26 without distributing to the left eye thereof. Likewise, when the left-eye perspective is displayed on the color TV display 60, the plate 58 displays the inverted observer's left half face image so as to distribute the left-eye perspective only to the left eye of each observer 26 without distributing to the right eye thereof. Thus, the plate 58 serves as a shutter system for the color TV display 60.

As a result, an inverted stereoscopic image is projected in the object space between the large format lens 22 and each observer 26, and accordingly, each observer 26 can observe an undistorted stereoscopic image therein.

With the second embodiment, the above object space serves as the virtual space of virtual reality. Accordingly, the stereoscopic image appearing in the above object space can be effectively used in micro surgery, surgery simulation, etc.

Furthermore, by disposing another large format lens on the plane on which the large format lens 22 projects the stereoscopic image, the observable area for each observer 26 can be enlarged.

Figure 6:
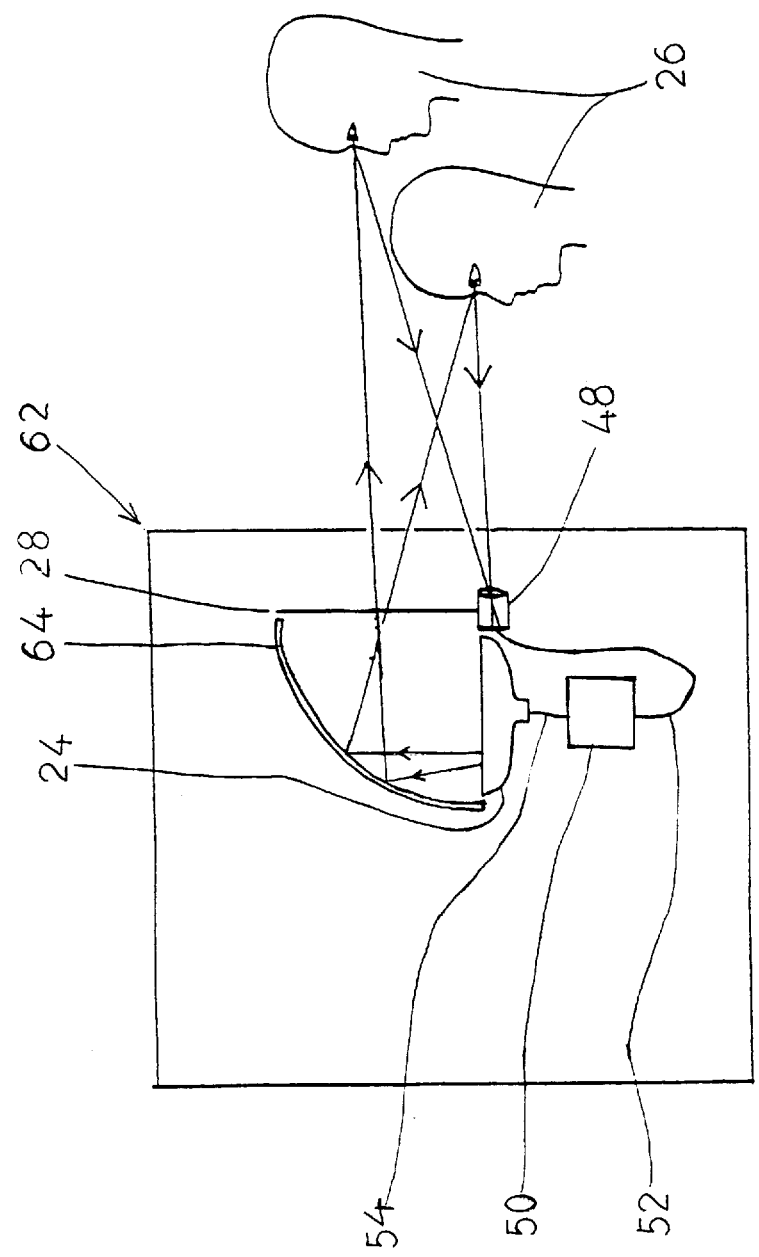
FIG. 6 is a schematic side view illustrating optical paths of a third embodiment of a stereoscopic television provided in accordance with the principle of the present invention.

FIG. 6 illustrates a third embodiment of a stereoscopic television in accordance with the present invention. In the drawings, parts similar to those in FIGS. 2 and 3 are given the same numbers as in FIGS. 2 and 3, and repetition of the previous description will be omitted.

In the stereoscopic television of the present embodiment, a concave mirror 64 is provided in place of the large format lens 22 of the first embodiment. And the monochrome TV display 24 is disposed so as to direct upwardly on the underside of the concave mirror 64, namely on the plane on which the concave mirrors 64 substantially focuses the observer's image.

With the third embodiment, the size of the image output screen of the color liquid-crystal plate 28 can be increased because the concave mirror 64 can reduce optical aberrations, as compared with the large format lens 22, and accordingly is free from color correction.

Furthermore, the large format lens 22 in the second embodiment may be also replaced with a concave mirror 66, as illustrated in FIG. 7.

With the present invention, the large format lens 22 as the focusing means may be composed of plural lenses in place of one piece of lens in the first and second embodiments. Furthermore, in place of the above-described large format lens and the concave mirror employed in the third embodiment, a Fresnel convex lens, a holographic lens, a diffraction grating lens or a combination of a convex lens with a mirror may be employed as the focusing means.

With respect to the observer's image display means, any means which can two-dimensionally display binary images may be employed in place of the monochrome TV display 24 and liquid-crystal plate 58.

The TV camera may be disposed on the optical axis of the focusing means such as the large format lens 22 by using a half mirror or the like.

The light sources for illuminating the observer's face need not necessarily be provided. If provided, any light sources which emit visible rays, infrared rays, or ultraviolet rays will do. In either case, the TV camera must have sensitivity to the selected rays.

In addition, in place of the TV camera, such a system as to use microwave or ultra sonic wave may be employed.

The stereoscopic television of the present invention may have automatic focusing mechanism which automatically adjusts the distance between the focusing means and the observer's image display means to such a distance that the focusing means correctly focuses the observer's image on the observer's image display means.

A large format lens, a Fresnel convex lens, a holographic lens or a diffraction grating lens may be provided in contact with the screen of the obsrver's image display means to improve the backlight effect thereof.

The left and right light sources are not required as long as two TV cameras having sensitivity to the infrared rays are arranged so that their optical axes are horizontally in parallel with each other, and the output two binary parallax images are used as images for the back-light. In this case, a single infrared light source may be provided in front of the observers.

Furthermore, in the above case, one of the two TV cameras may be omitted by forming inverted binary parallax images from the binary parallax images output by one TV camera, and using the formed inverted binary parallax images as images for the back-light.

In the preceding embodiments, the present invention has been explained based on the time-interlaced stereoscopic television. In addition, the present invention may be applied to the time-parallel stereoscopic television by employing two stereoscopic televisions and a half mirror.

In the stereoscopic televisions of the second and third embodiments, by displaying left eye and right eye perspectives on the stereoscopic image display means as polarized images which are polarized 90° to each other, they can be used as time-parallel stereoscopic televisions.

As described above, with the stereoscopic television of the present invention, stereoscopic images can be observed simultaneously by several persons without wearing any special glasses and without any positional limitation, as long as they are positioned within the observable area thereof.

While the invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A stereoscopic television comprising:
   stereoscopic image display means for enabling display of stereo-pairs composed of left and right eye perspectives;
   observer's image display means for enabling display of binary images of an observer's face;
   focusing means for focusing said left and right eye perspective of said stereo-pairs to left and right eyes of each observer based on said binary images displayed by said observer's image display means, said focusing means being disposed in a predetermined plane from which said focusing means substantially focuses the observer's image on a screen of said observer's image display means.

2. The stereoscopic television according to claim 1, wherein said stereoscopic image display means is composed of transparent and electro-optical spatial modulation elements which are disposed in front of said focusing means, and said observer's image display means is composed of a back-light which is disposed behind said focusing means.

3. The stereoscopic television according to claim 2, wherein said electro-optical spatial modulation elements are composed of a color liquid-crystal plate, and said back-light is composed of a monochrome TV display.

4. The stereoscopic television according to claim 1, wherein said stereoscopic image display means is disposed behind said observer's image display means, and said observer's image display means is composed of transparent and electro-optical spatial modulation elements which are disposed behind said focusing means.

5. The stereoscopic television according to claim 4, further comprising a large format lens which is disposed in a predetermined plane on which the stereoscopic image displayed by said stereoscopic image display means is focused by said focusing means.

6. The stereoscopic television according to claim 4, wherein said electro-optical spatial modulation elements are composed of a monochrome liquid-crystal plate, and said stereoscopic image display means is composed of a color TV display.

7. The stereoscopic television according to claim 1, further comprising taking means provided near said focusing means for enabling the observer's face images to be continuously taken and outputting a binary image signal based on said observer's face images to said observer's image display means.

8. The stereoscopic television according to claim 7, further comprising illuminating means provided on left and right sides of said focusing means for alternately illuminating the observer's face from the left and right sides thereof in synchronization with said stereoscopic image, and wherein said taking means takes left and right illuminated face images of the observer.

9. The stereoscopic television according to claim 8, further comprising imaging means for subtracting one of said left and right illuminated face images of the observer from the other face image, and emphasizing the contrast of the resultant image.

10. The stereoscopic television according to claim 7, wherein said taking means comprises a video camera.

11. The stereoscopic television according to claim 1 wherein said focusing means is composed of a large format lens including at least one lens.

12. The stereoscopic television according to claim 11 wherein said large format lens is a Fresnel convex lens.

13. The stereoscopic television according to claim 1, wherein said focusing means is selected from the group consisting of a concave mirror, a holographic lens, and a diffraction grating lens.

14. The stereoscopic television according to claim 1, wherein said binary images of the observer's face are displayed on the screen of the observer's image display means at a position which substantially geometrically corresponds with the observer's image which is substantially focused by said focusing means.

15. The stereoscopic television according to claim 1, wherein said stereoscopic image display means enables time-interlaced display of said stereo-pairs, and said observer's image display means enables time-interlaced display of said binary images such that said time-interlaced displays by said stereoscopic image display means and said observer's image display means are in synchronization with each other.

16. The stereoscopic television according to claim 1, wherein said stereoscopic image display means enables time-parallel display of said stereo-pairs, and said observer's image display means enables time-parallel display of said binary images.

17. A stereoscopic television comprising:
   stereoscopic image display means for enabling display of stereo-pairs composed of left and right eye perspectives;
   observer's image display means for enabling display of binary images of an observer's face; and
   focusing means for focusing said left and right eye perspectives of said stereo-pairs to left and right eyes of each observer based on said binary images displayed by said observer's image display means, said observer's image display means being disposed behind said focusing means.

\* \* \* \* \*